(12) United States Patent
Poehls et al.

(10) Patent No.: US 12,241,571 B2
(45) Date of Patent: Mar. 4, 2025

(54) FLEXIBLE HOSE END FITTING ASSEMBLY

(71) Applicant: SPM Oil & Gas Inc., Fort Worth, TX (US)

(72) Inventors: Justin Lane Poehls, Glen Rose, TX (US); David Theodore Figgs, Fort Worth, TX (US); Nuder Said, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 45 days.

(21) Appl. No.: 17/997,502

(22) PCT Filed: Apr. 27, 2021

(86) PCT No.: PCT/US2021/029502
§ 371 (c)(1),
(2) Date: Oct. 28, 2022

(87) PCT Pub. No.: WO2021/222329
PCT Pub. Date: Nov. 4, 2021

(65) Prior Publication Data
US 2023/0175618 A1    Jun. 8, 2023

Related U.S. Application Data

(60) Provisional application No. 63/018,294, filed on Apr. 30, 2020.

(51) Int. Cl.
*F16L 23/036* (2006.01)
*F16L 21/06* (2006.01)
*F16L 23/16* (2006.01)

(52) U.S. Cl.
CPC ........... *F16L 23/036* (2013.01); *F16L 21/065* (2013.01); *F16L 23/162* (2013.01)

(58) Field of Classification Search
CPC ..... F16L 23/036; F16L 21/065; F16L 23/162; F16L 23/02
USPC .......................................... 285/373, 419, 368
See application file for complete search history.

(56) References Cited

U.S. PATENT DOCUMENTS

| | | | |
|---|---|---|---|
| 1,825,962 A | | 10/1931 | Laird |
| 4,023,836 A | * | 5/1977 | Applehans ............... F16L 23/02 285/368 |
| 4,049,297 A | * | 9/1977 | Reneau ................... F16L 19/08 285/365 |

(Continued)

OTHER PUBLICATIONS

International Search Report and Written Opinion issued in Application No. PCT/US21/29502 dated Sep. 16, 2021.

*Primary Examiner* — David Bochna

(57) ABSTRACT

A flexible hose end fitting assembly includes a first portion defining a first fluid passageway and having a first end configured for coupling to a fluid conduit, a second portion defining a second fluid passageway and having a first end configured for coupling to a second end of the first portion and a second end configured for securely affixed to a flexible hose. A gasket is disposed in a groove formed in an interface between the first portion and the first end of the second portion of the assembly, and the first portion and the first end of the second portion of the assembly are securely fastened together by a plurality of threaded fasteners to form a continuous fluid passageway between the fluid conduit and the flexible hose.

8 Claims, 9 Drawing Sheets

(56) References Cited

U.S. PATENT DOCUMENTS

| | | | | |
|---|---|---|---|---|
| 4,106,798 A | * | 8/1978 | Haug | F16L 23/04 |
| | | | | 285/349 |
| 4,152,016 A | | 5/1979 | Weinhold | |
| 4,169,906 A | | 10/1979 | Hallstrom et al. | |
| 4,337,971 A | * | 7/1982 | Kendrick | F16L 37/121 |
| | | | | 285/920 |
| 4,443,029 A | * | 4/1984 | Laxo | F16L 23/08 |
| | | | | 285/93 |
| 4,516,795 A | * | 5/1985 | Baugh | F16L 37/002 |
| | | | | 285/315 |
| 4,603,887 A | * | 8/1986 | Mayfield | F16L 27/1275 |
| | | | | 285/298 |
| 4,611,833 A | * | 9/1986 | Lescaut | F16L 13/0263 |
| | | | | 285/55 |
| 4,850,521 A | | 7/1989 | Servant | |
| 5,269,572 A | * | 12/1993 | Mefferd | F16L 21/06 |
| | | | | 403/339 |
| 5,470,114 A | * | 11/1995 | Umney | F16L 23/08 |
| | | | | 285/347 |
| 10,781,948 B1 | * | 9/2020 | Gregory | F16L 21/065 |
| 2006/0284420 A1 | | 12/2006 | Dole | |
| 2007/0267868 A1 | * | 11/2007 | Holzheu | F16L 23/20 |
| | | | | 285/364 |
| 2008/0036209 A1 | * | 2/2008 | Bulkovitch | F16L 21/035 |
| | | | | 285/368 |
| 2016/0153598 A1 | * | 6/2016 | Bertoni | F16L 23/02 |
| | | | | 285/55 |
| 2016/0273689 A1 | * | 9/2016 | Considine, Jr. | F16L 21/065 |
| 2018/0135755 A1 | | 5/2018 | McKay et al. | |
| 2018/0142817 A1 | | 5/2018 | McKay | |
| 2018/0187507 B1 | * | 7/2018 | Hill | F16L 23/02 |
| 2019/0003622 A1 | | 1/2019 | Karoliussen | |
| 2019/0032824 A1 | * | 1/2019 | McNamara | F16L 21/065 |
| 2021/0404579 A1 | * | 12/2021 | Post | F16L 23/02 |
| 2022/0228680 A1 | * | 7/2022 | Tanimura | F16L 23/02 |

* cited by examiner

FLEXIBLE HOSE END FITTING ASSEMBLY

CROSS-REFERENCE TO RELATED APPLICATION

This Patent Application is a 371 national stage of PCT Application No. PCT/US2021/029502, filed on Apr. 27, 2021, entitled "FLEXIBLE HOSE END FITTING ASSEMBLY," which claims priority to U.S. Provisional Application No. 63/018,294, filed on Apr. 30, 2020, entitled "FLEXIBLE HOSE END FITTING ASSEMBLY," and assigned to the assignee hereof. The disclosures of the prior Applications are considered part of and are incorporated by reference into this Patent Application.

FIELD

The present disclosure relates to a flexible hose end fitting assembly for oil and gas fracking and production operations.

BACKGROUND

Flexible conduits have been used to transport high-pressure applications fluids in oil and gas applications. In existing technology, the end coupling to the hammer union/safety iron is integrated into the flexible hose end coupling. This end coupling is either machined as one part of two separate parts that are butt welded together.

DETAILED DESCRIPTION

Most premature failures associated with flexible hoses used in hydraulic fracturing applications occur at the end fittings. These types of failures are caused by leaks, wash/jetting, threaded connection failures, etc. When failure occurs at the end fitting, the entire flexible hose assembly must be replaced because it is constructed as a single unit. The inventive concept described herein involves separating the end coupling to the hammer union/safety iron from the flexible hose coupling, so that when the flexible hose assembly fails at the safety iron connector. the entire assembly does not require replacement. The flexible hose may be constructed of a plurality of layers that are fabricated from reinforced materials and structural components that give tensile and compressive strength to the flexible hose so that it may transport fluids at high pressures. For example, the flexible hose may include a reinforcement layer constructed of a composite tape helically wound around a pipe.

Figure 1:
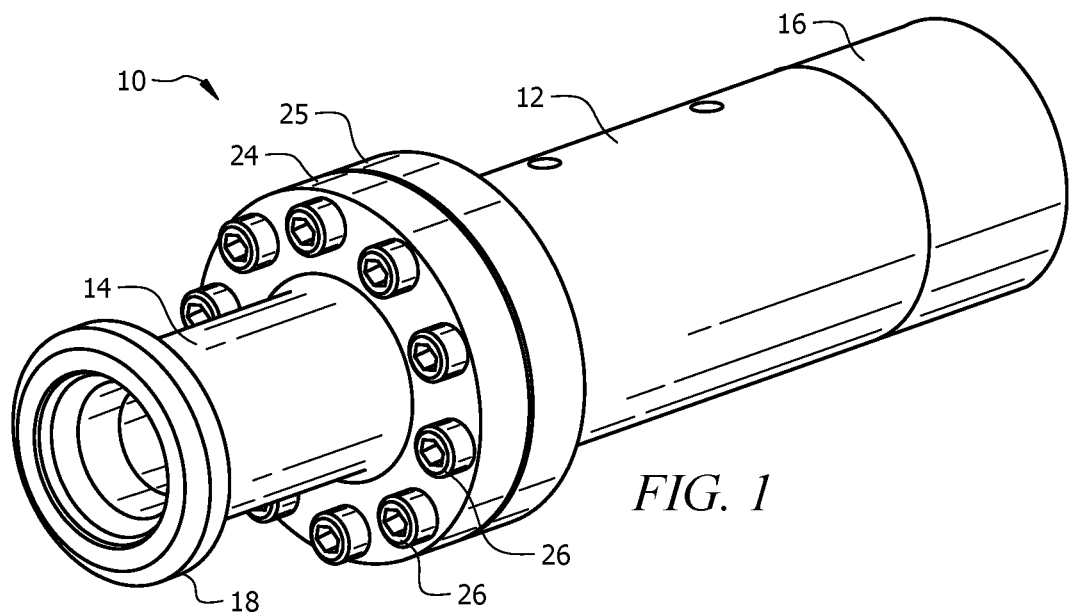
FIG. 1 is a perspective view of a first example embodiment of a flexible hose end fitting assembly according to the teachings of the present disclosure.
Figure 2:
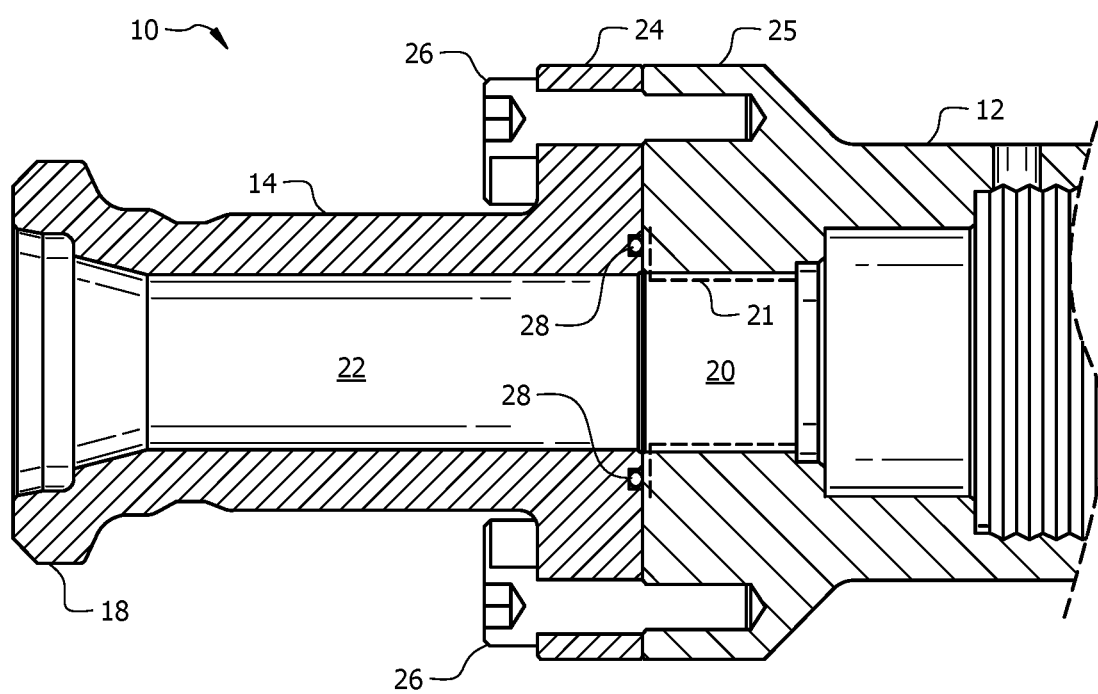
FIG. 2 is a cross-sectional view of the first example embodiment of a flexible hose end fitting assembly according to the teachings of the present disclosure.

FIG. 1 is a perspective view of a first example embodiment of a flexible hose end fitting assembly 10 according to the teachings of the present disclosure. The flexible hose end fitting assembly 10 has two primary parts, a flexible hose coupling portion 12 and a safety iron/hammer union connection coupling (also referred to as a "connection coupling") 14. The flexible hose coupling portion 12 is configured to be secured to an end of the flexible hose 16 by mechanical gripping means, bonding means, adhesive means, and/or other suitable means. Also referring to FIG. 2, the flexible hose coupling portion 12 defines a cylindrical or tubular cavity 20 that is in axial alignment with the flexible hose 16. The second part of the flexible hose end fitting, the connection coupling portion 14, includes a standard connector interface 18 that is designed to couple to another fluid conduit such as a safety iron or a hammer union. The connection coupling portion 14 also defines a cylindrical or tubular cavity 22 that is in axial alignment with the cylindrical cavity 20 of the flexible hose coupling portion 12 when the two parts 12 and 14 are assembled together. The connection coupling portion 14 includes an annular flange 24 that is designed to interface with an enlarged end 25 of the flexible hose end fitting 12 and the two portions can be secured together by a plurality of threaded fasteners 26 such as socket head cap screws (SHCS). As shown in FIG. 2, one or more annular metal gaskets or o-ring seals 28 may be disposed in a groove machined or formed in the axial faces of the flexible hose coupling and/or connection coupling portions 12 and 14 of the flexible hose end fitting assembly 10. To provide a barrier against the corrosive and abrasive frack fluid, a protective coating may be applied to all internal surfaces 21 (FIG. 2) that would be exposed to the frack fluid.

Figure 3:
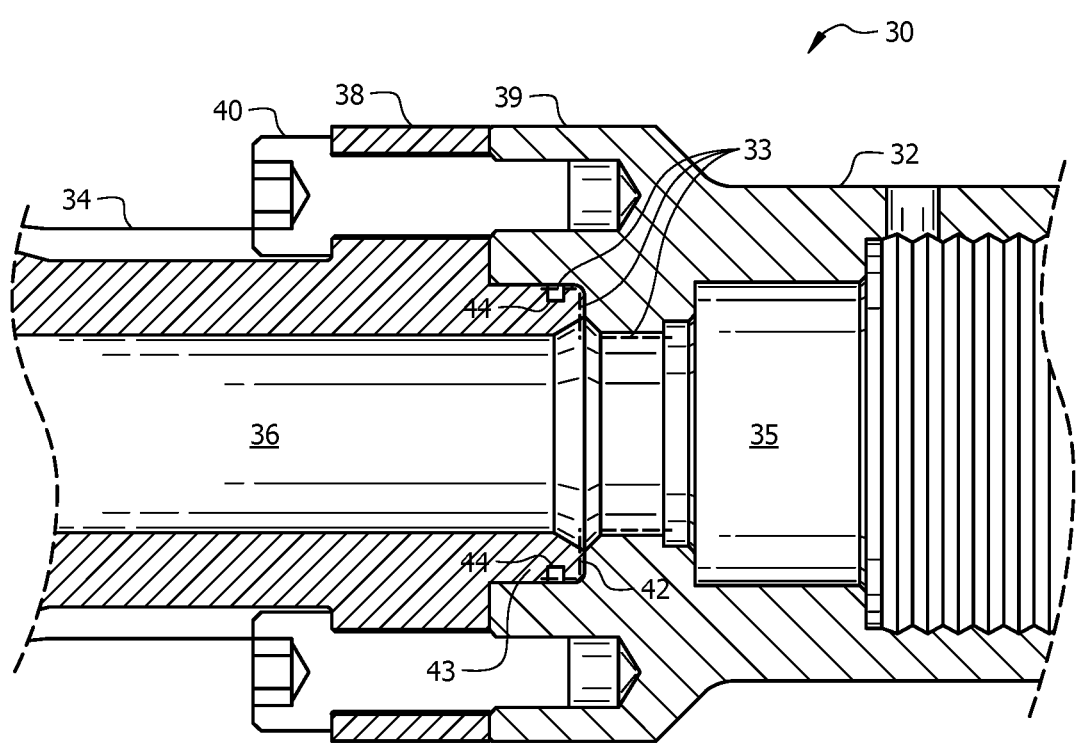
FIG. 3 is a cross-sectional view of a second example embodiment of a flexible hose end fitting assembly according to the teachings of the present disclosure.

FIG. 3 is a cross-sectional view of an alternate design for a flexible hose end fitting assembly 30 according to the teachings of the present disclosure. The flexible hose end fitting assembly 30 also has two primary parts, a flexible hose coupling portion 32 and a safety iron/hammer union connection coupling (a connection coupling) 34. The flexible hose coupling portion 32 is configured to be secured to an end of the flexible hose by mechanical gripping means, bonding means, adhesive means, and/or other suitable means. The flexible hose coupling portion 32 defines a cylindrical or tubular cavity 35 that is in axial alignment with the flexible hose. The second part of the flexible hose end fitting, the connection coupling portion 34, includes a standard connector interface that is designed to couple to another fluid conduit such as a safety iron or a hammer union. The connection coupling portion 34 also defines a cylindrical or tubular cavity 36 that is in axial alignment with the cylindrical cavity 35 of the flexible hose coupling portion 32 when the two parts 32 and 34 are assembled together. The connection coupling portion 34 includes an annular flange 38 that is designed to interface with an enlarged end 39 of the flexible hose end fitting 32 and the two portions can be secured together by a plurality of threaded fasteners 40 such as socket head cap screws (SHCS). The interface contours of the two portions include a cylindrical cavity 42 on the end of flexible hose coupling portion 32 that is sized and shaped to receive the cylindrical end 43 of the connection coupling portion 34. One or more rod/piston seals 44 may be disposed in a groove machined or formed in the cylindrical faces of the connection coupling and/or flexible hose coupling portions of the flexible hose end fitting assembly.

As shown in FIGS. 2 and 3, a protective coating may be applied to all internal surfaces 21 (FIG. 2) and 33 (FIG. 3) of the flex hose coupling that would be exposed to corrosive and abrasive frack fluids to reduce and eliminate corrosion/erosion at these areas. The protective coating may be a tungsten carbide coating applied using, e.g., HVOF spray technology. The application of the protective coating is not limited to the flex hose coupling surfaces but can be applied to the internal surfaces of the connection coupling to extend the life of this component as well.

Figure 4:
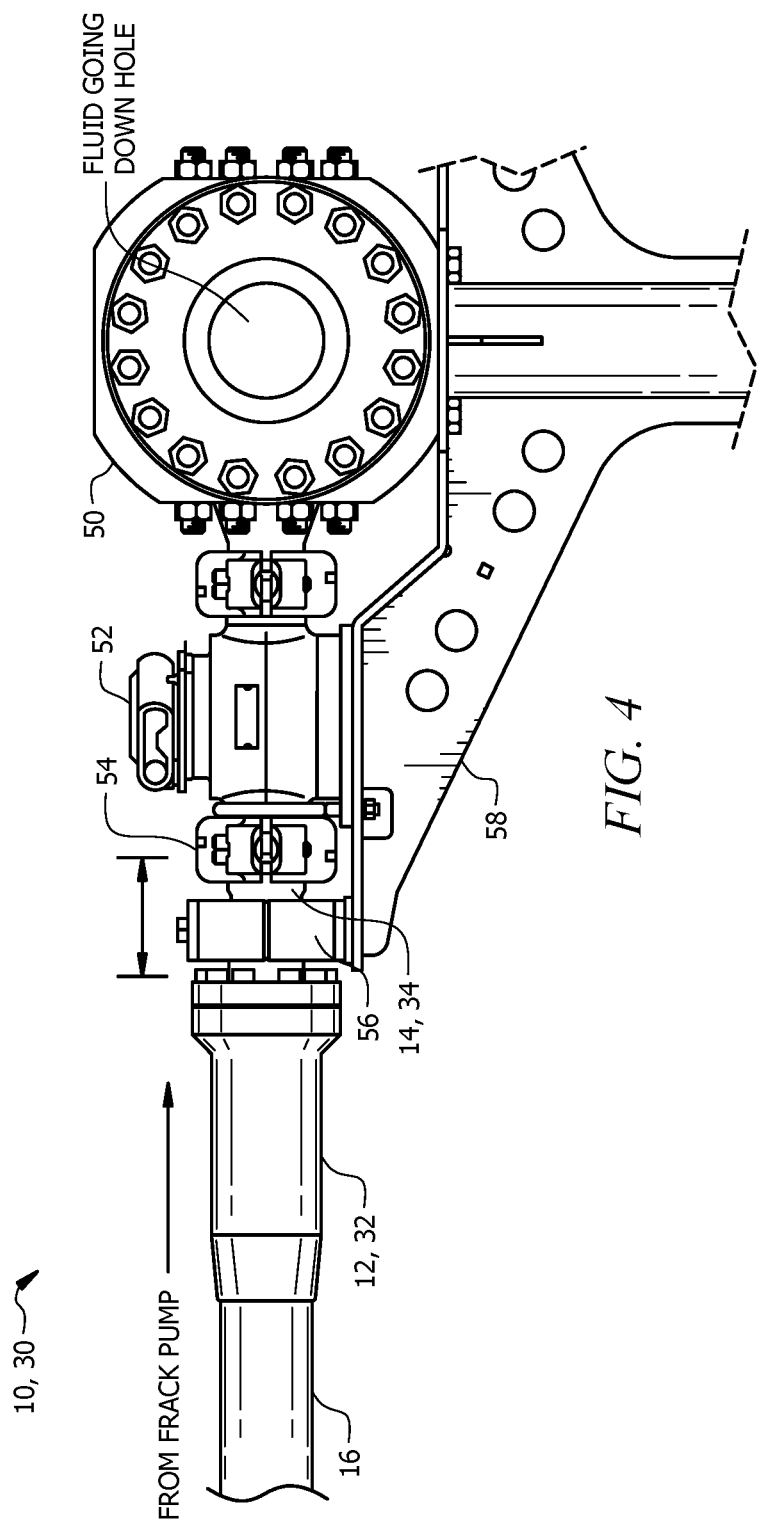
FIGS. 4 and 5 are side and perspective views of the first and second example embodiments of a flexible hose end fitting assembly according to the teachings of the present disclosure.
Figure 5:
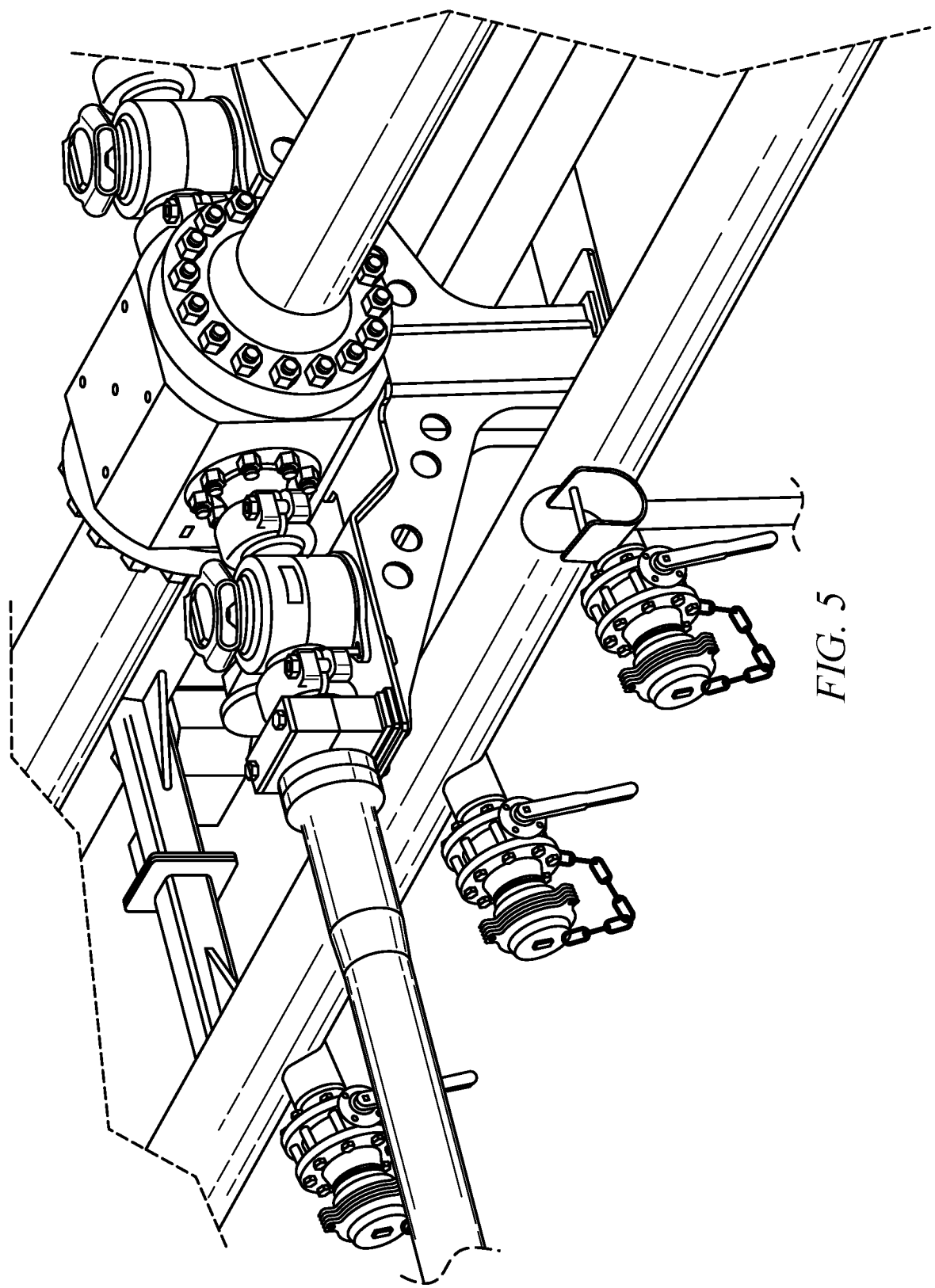

FIGS. 4 and 5 are side and perspective views of a flexible hose end fitting assembly 10, 30 coupled to a large bore manifold 50 via a check valve 52. The connection coupling portion 14, 34 is coupled to the check valve 52 using a safety iron clamp 54. The narrow neck portion of the connection coupling 14, 34 is sized to allow a conventional tube clamp or stauff clamp 56 that would support the weight of the flexible hose end fitting assembly. For example, the narrow neck portion of the connection coupling may be approximately nine inches long from the standard connector interface 18 to the annular flange 24. The tube clamp 56 may be secured to a support or skid structure 58. The flexible hose coupling portion 12, 32 is secured to a flexible hose 16 that is coupled to a frack pump or conventional flow iron at the other end. The frack pump pumps the frack fluid to the wellbore via the large bore manifold via the flexible hose 16 and flexible hose end fitting assembly. To provide a barrier against the corrosive and abrasive frack fluid, a protective coating may be applied to all internal surfaces that would be exposed to the frack fluid.

Figure 6:
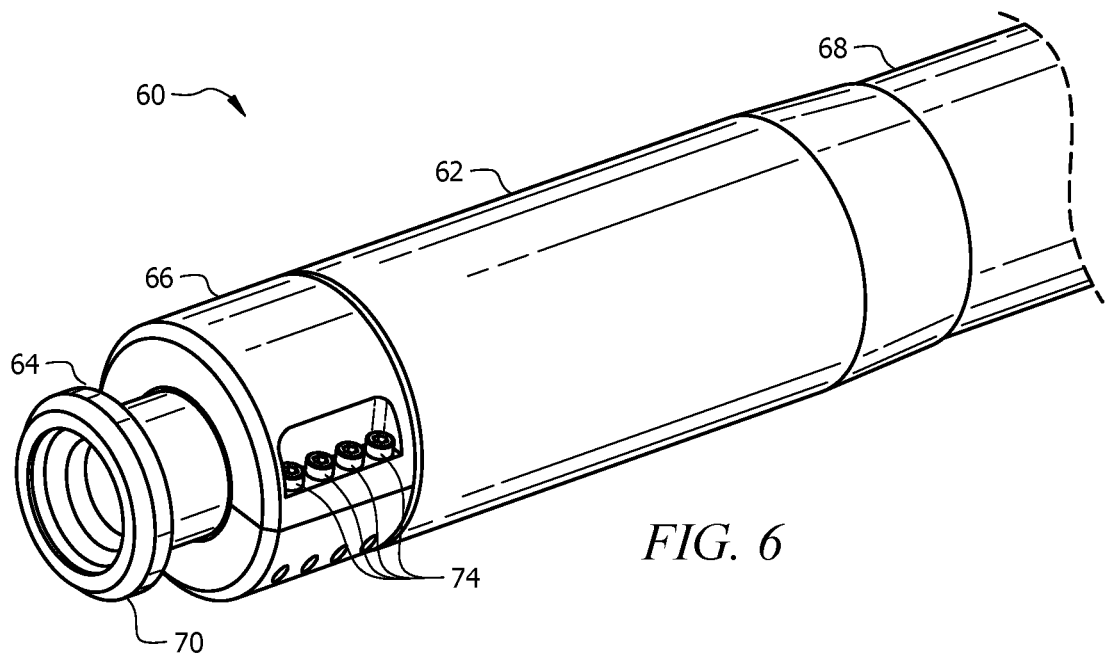
FIGS. 6 and 7 are perspective and cross-sectional views of a third example embodiment of a flexible hose end fitting assembly according to the teachings of the present disclosure.
Figure 7:
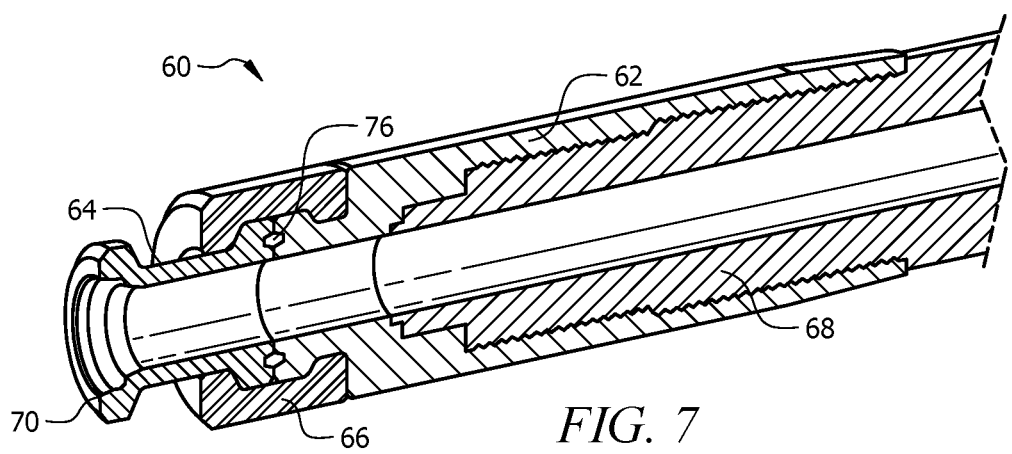

FIGS. 6 and 7 provide perspective and cross-sectional views of another example embodiment of a flexible hose end fitting assembly 60 according to the teachings of the present disclosure. This example flexible hose end fitting assembly 60 has a flexible hose coupling 62 and a connection coupling 64, with a two-part annular clamp 66. The flexible hose coupling portion 62 is configured to be secured to an end of the flexible hose 68 by mechanical gripping means, bonding means, adhesive means, and/or other suitable means. The flexible hose coupling portion 62 defines a cylindrical or tubular cavity that is in axial alignment with the flexible hose 68. The second part of the flexible hose end fitting assembly, the connection coupling portion 64, includes a standard connector interface 70 to another fluid conduit such as a safety iron or a hammer union. The connection coupling portion 64 also defines a cylindrical or tubular cavity that is in axial alignment with the cylindrical cavity of the flexible hose coupling portion 62 when the two parts are assembled together. The flexible hose coupling and connection coupling portions of the flexible hose end fitting 60 each has flanged ends 72 and 73 that are encircled and held together by the two-part annular clamp 66 hat are secured by a plurality of threaded fasteners 74 such as socket head cap screws (SHCS). As shown in FIG. 7, one or more annular gaskets or seals 76 may be disposed in a grooved interface between the safety iron coupling and flexible hose coupling portions of the flexible hose end fitting assembly 60. The groove may be formed or machined in one or both portions. To provide a barrier against the corrosive and abrasive frack fluid, a protective coating may be applied to all internal surfaces that would be exposed to the frack fluid.

Figure 8:
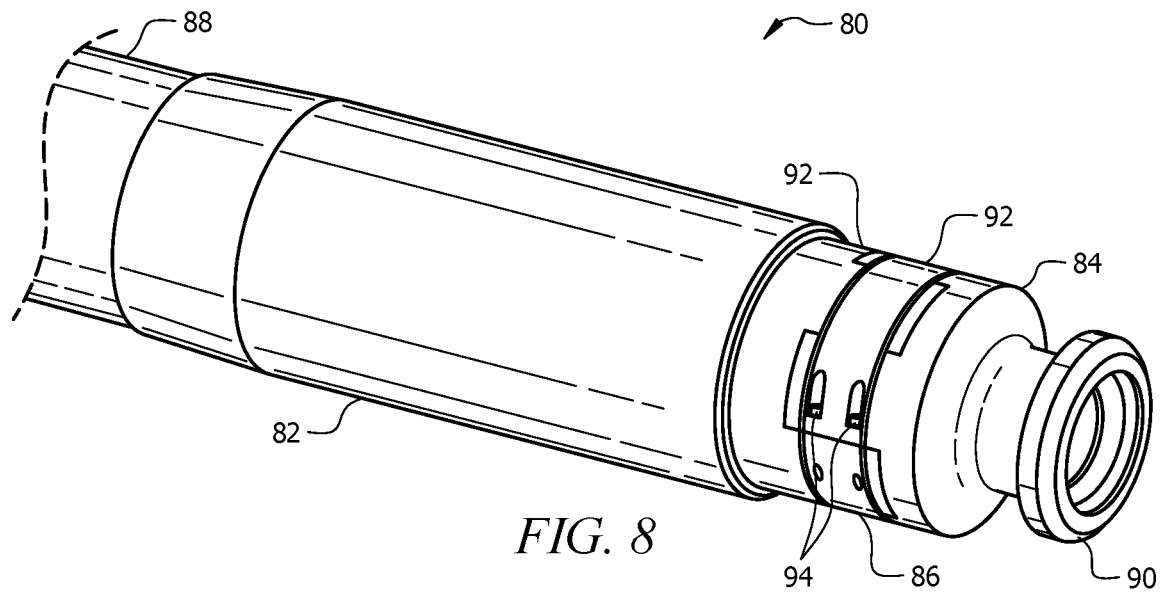
FIGS. 8-10 are perspective, exploded and cross-sectional views of a fourth example embodiment of a flexible hose end fitting assembly according to the teachings of the present disclosure.
Figure 9:
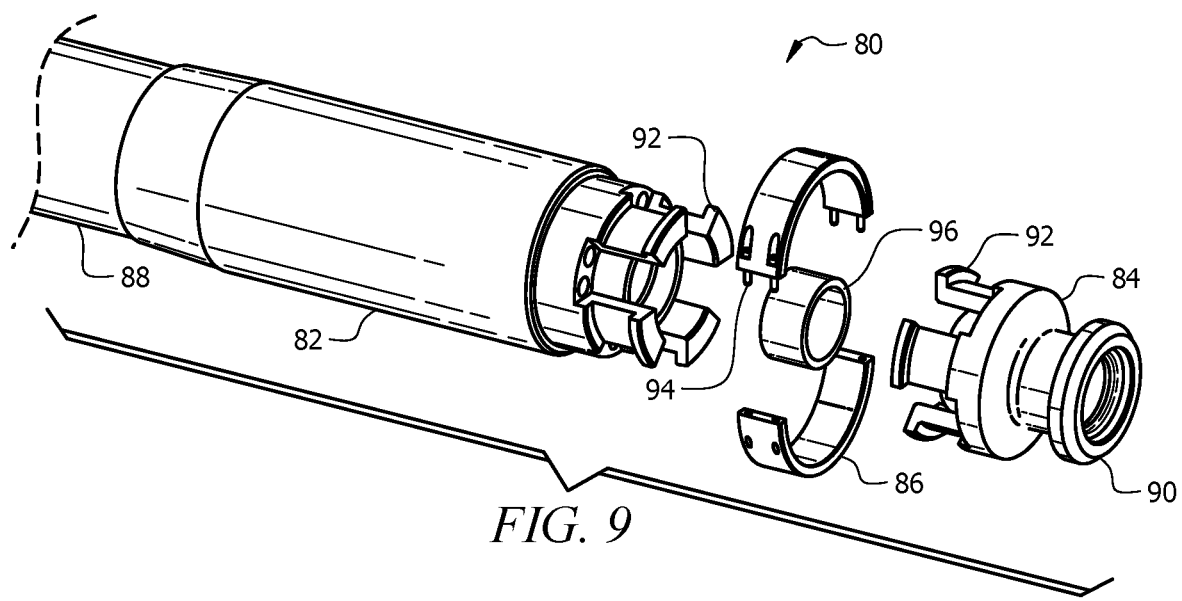
Figure 10:
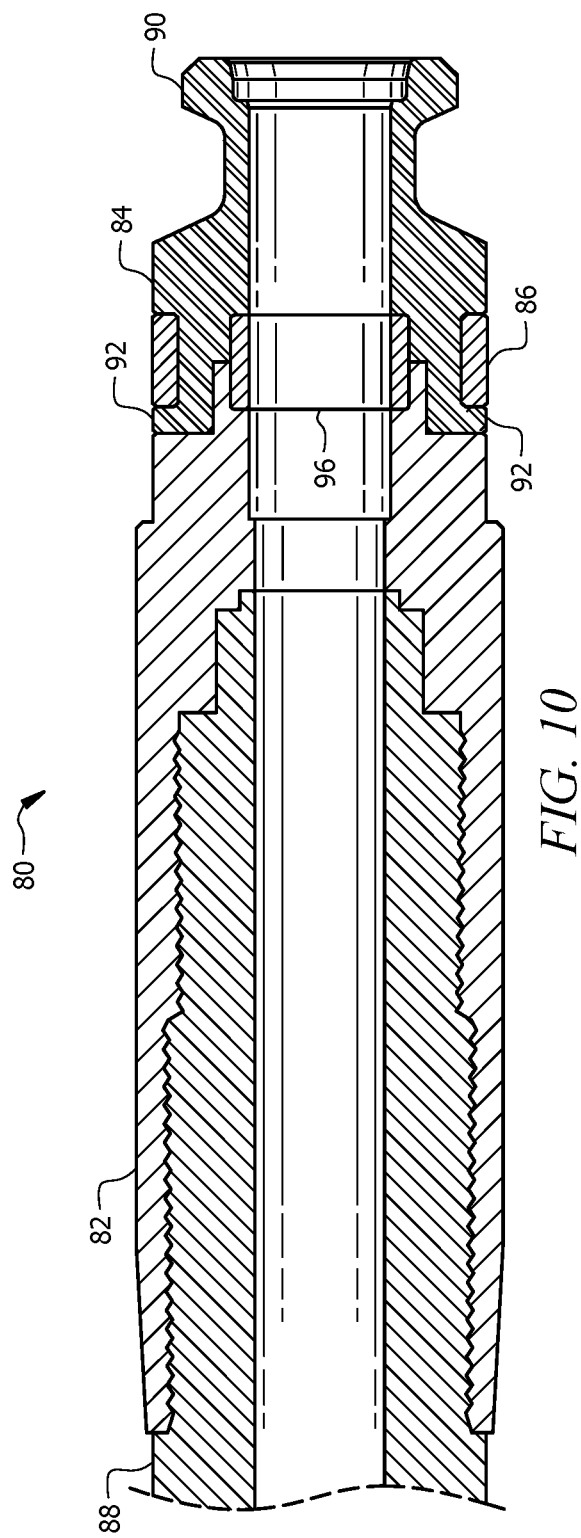

FIGS. 8-10 are various views of another example embodiment of a flexible hose end fitting assembly 80 according to the teachings of the present disclosure. This example flexible hose end fitting assembly 80 has a flexible hose coupling 82 and a connection coupling 84, with a two-part ring clamp 86. The flexible hose coupling portion 82 is configured to be secured to an end of the flexible hose 88 by mechanical gripping means, bonding means, adhesive means, and/or other suitable means. The flexible hose coupling portion 82 defines a cylindrical or tubular cavity that is in axial alignment with the flexible hose 88. The second part of the flexible hose end fitting assembly 80, the connection coupling portion 84, includes a standard connector interface 90 to another fluid conduit such as a safety iron or a hammer union. The connection coupling portion 84 also defines a cylindrical or tubular cavity that is in axial alignment with the cylindrical cavity of the flexible hose coupling portion 82 when the two parts are assembled together. The flexible hose coupling and connection coupling portions of the flexible hose end fitting each include flanged fingers 92 that are configured to interlock and be encircled and held together by the two-part ring clamp 86 that are secured by a plurality of fasteners 94. An inner conduit 96 is held within the interlocking flanged fingers 94 of both portions and ring clamp to conduct the frack fluid. To provide a barrier against the corrosive and abrasive frack fluid, a protective coating may be applied to all internal surfaces that would be exposed to the frack fluid.

Figure 11:
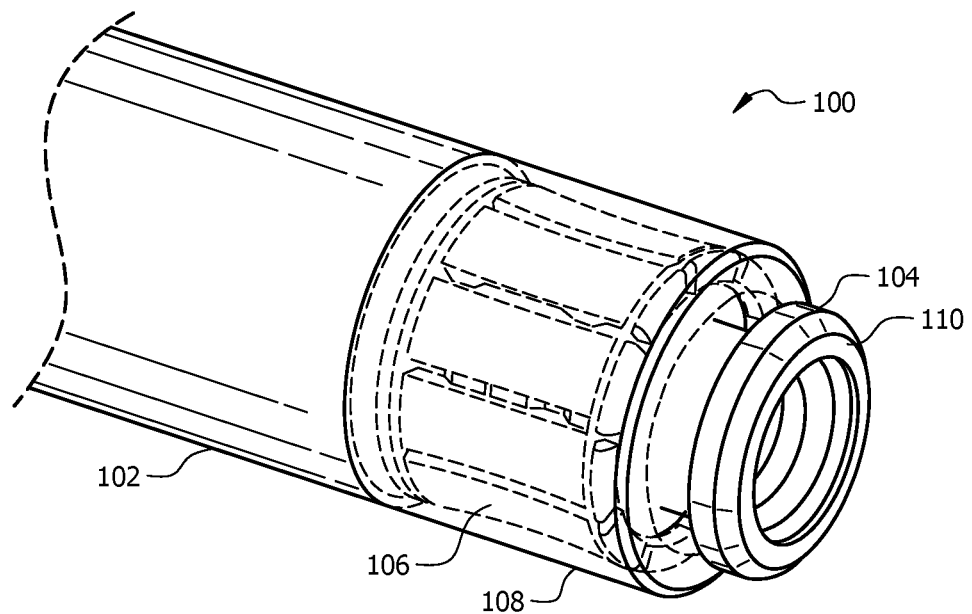
FIGS. 11-13 are perspective, exploded and cross-sectional views of a fifth example embodiment of a flexible hose end fitting assembly according to the teachings of the present disclosure.
Figure 12:
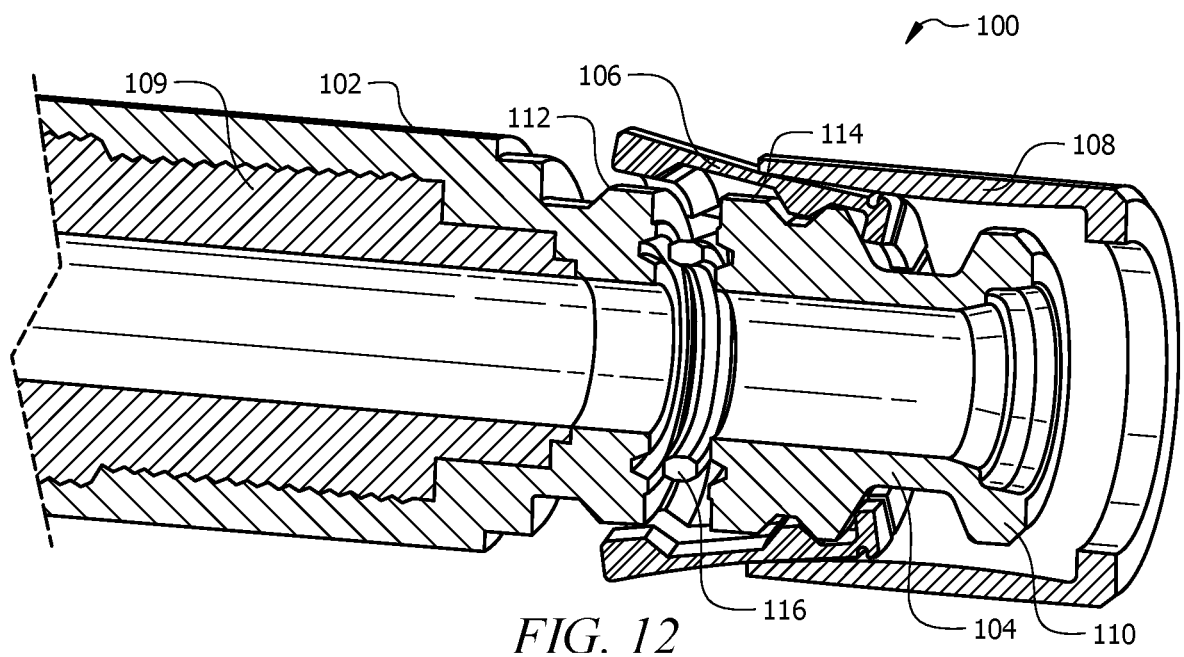
Figure 13:
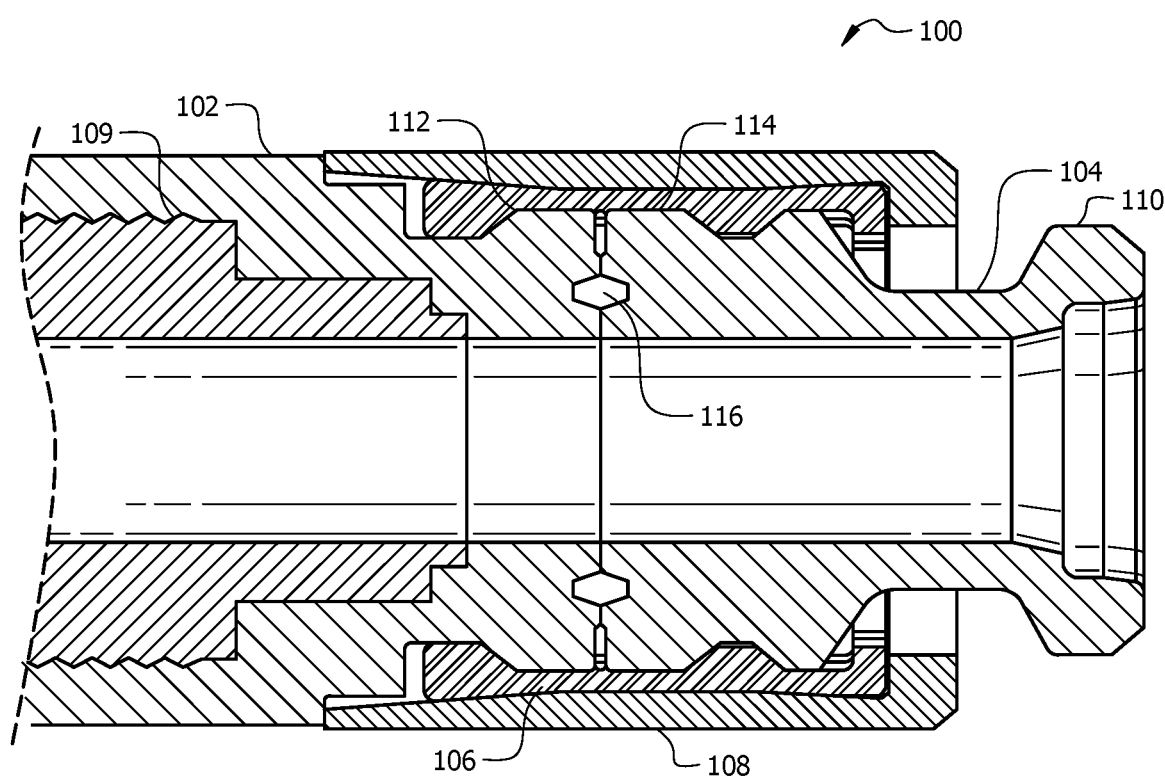

FIGS. 11-13 are various views of another example embodiment of a flexible hose end fitting assembly 100 according to the teachings of the present disclosure. This example flexible hose end fitting assembly 100 has a flexible hose coupling 102 and a connection coupling 104, with collets 106 and an outer reaction collar 108. The flexible hose coupling portion 102 is configured to be secured to an end of the flexible hose by mechanical gripping means, bonding means, adhesive means, and/or other suitable means. The flexible hose coupling portion 102 defines a cylindrical or tubular cavity that is in axial alignment with the flexible hose 109. The second part of the flexible hose end fitting assembly, the connection coupling portion 104, includes a standard connector interface 110 to another fluid conduit such as a safety iron or a hammer union. The connection coupling portion 104 also defines a cylindrical or tubular cavity that is in axial alignment with the cylindrical cavity of the flexible hose coupling portion 102 when the two parts are assembled together. The flexible hose coupling and connection coupling portions of the flexible hose end fitting 100 each include flanged ends 112 and 114 that are configured to be held together by a collet 106, which is encircled by the outer reaction collar 108 and causes the collet 106 to tighten around the flanged ends 112 and 114 of the two portions. One or more annular gaskets or seals 116 may be disposed in a grooved interface between the connection coupling and flexible hose coupling portions of the flexible hose end fitting assembly. The groove may be formed or machined in one or both of the parts. To provide a barrier against the corrosive and abrasive frack fluid, a protective coating may be applied to all internal surfaces that would be exposed to the frack fluid.

Although not shown explicitly, all embodiments described herein may incorporate a narrow neck section that enables the use of a tube clamp to support the weight of the flexible hose end fitting assembly Using an end fitting assembly that has two separable portions, the entire flexible hose assembly does not need to be replaced when the integrity of the coupling to the hammer union/safety iron is compromised. When it fails, the coupling portion to the hammer union/safety iron becomes the sacrificial piece that can be easily replaced without scrapping the entire flexible hose assembly.

The features of the present invention which are believed to be novel are set forth below with particularity in the appended claims. However, modifications, variations, and changes to the exemplary embodiments described above will be apparent to those skilled in the art, and the flexible hose end fitting assembly described herein thus encompasses such modifications, variations, and changes and are not limited to the specific embodiments described herein.

What is claimed is:

1. A flexible hose end fitting assembly comprising:
   a first portion of the assembly having a first end configured for coupling to an end of a first fluid conduit and a flanged end comprising a plurality of flanged fingers, the flanged fingers of the first portion of the assembly having a flanged portion extending radially outward;
   a second portion of the assembly having a flanged end comprising a plurality of flanged fingers configured to interlock with the plurality of flanged fingers of the flanged end of the first portion, and a second end configured for coupling to a second fluid conduit, the flanged fingers of the second portion of the assembly having a flanged portion extending radially outward;
   an inner conduit segment disposed at an interface of the interlocking flanged ends of the first and second portions of the assembly; and
   a ring clamp positioned at least partially within a groove formed by the flanged portions of the first and second portions of the assembly, the ring clamp configured to encircle and secure the interlocking flanged fingers of the ends of the first and second portions of the assembly, the first and second portions forming a continuous fluid conduit from the first fluid conduit and the second fluid conduit.

2. The flexible hose end fitting assembly of claim 1, wherein the first portion of the assembly has a narrow neck section.

3. The flexible hose end fitting assembly of claim 1, wherein surfaces of a fluid passageway of at least one of the first portion and the second portion incorporates a protective tungsten-carbide coating.

4. A flexible hose end fitting assembly comprising:
   a first portion of the assembly having a first end configured for coupling to an end of a first fluid conduit and a flanged end;
   a second portion of the assembly having a flanged end configured for interlocking with the flanged end of the first portion and a second end configured for coupling to a second fluid conduit;
   a gasket disposed in a groove formed in an interface between the flanged ends of the first and second portions of the assembly;
   a collet disposed about the flanged ends of the first and second portions of the assembly; and
   an outer reaction collar having a curved inner surface along an axial length of the outer reaction collar and a lip extending radially towards a centerline of the outer reaction collar, the outer reaction collar encircling and in contact with the collet and the lip of the outer reaction collar abutting an end of the collet, thereby securing the collet around the interlocking flanged ends of the first and second portions of the assembly,
   wherein the first and second portions form a continuous fluid conduit from the first fluid conduit and the second fluid conduit.

5. The flexible hose end fitting assembly of claim 4, wherein the first portion of the assembly has a narrow neck section having a length and outer diameter consistent for coupling with a tube clamp supported on a manifold structure.

6. The flexible hose end fitting assembly of claim 4, wherein surfaces of a fluid passageway of at least one of the first portion and the second portion incorporates a protective tungsten-carbide coating.

7. The flexible hose end fitting assembly of claim 4, wherein the outer reaction collar causes the collet to tighten around the flanged ends of the interlocking flanged ends of the first and second portions of the assembly.

8. The flexible hose end fitting assembly of claim 4, wherein the outer reaction collar is in contact with the collet along a full length of the collet when the collet is tightened around the interlocking flanged ends of the first and second portions of the assembly.

* * * * *